M. JOHNSON,

Assignor, by mesne assignments, to C. La Dow.

Rotary-Cultivator.

No. 9,169. Reissued April 20, 1880.

WITNESSES.

Wm. A. Skinkle,

Geo W. Beck

By his Attorneys

Charles La Dow ASSIGNEE OF

Moses Johnson INVENTOR.

Baldwin, Hopkins & Peyton

THE NORRIS PETERS CO., WASHINGTON, D. C.

UNITED STATES PATENT OFFICE.

MOSES JOHNSON, OF LOCKPORT, NEW YORK, ASSIGNOR, BY MESNE ASSIGNMENTS, TO CHARLES LA DOW.

ROTARY CULTIVATOR.

SPECIFICATION forming part of Reissued Letters Patent No. 9,169, dated April 20, 1880.

Original No. 93,307, dated August 3, 1869; Reissue No. 8,222, dated May 7, 1878. Application for reissue filed November 11, 1879.

DIVISION B.

*To all whom it may concern:*

Be it known that I, MOSES JOHNSON, formerly of Three Rivers, in the county of St. Joseph and State of Michigan, but now residing at Lockport, in the county of Niagara and State of New York, have invented certain new and useful Improvements in Rotary Cultivators, of which I hereby declare the following to be a full, clear, and exact description, reference being had to the accompanying drawings, making a part of this specification, and in which—

Figure 6:
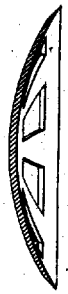
Figure 1:
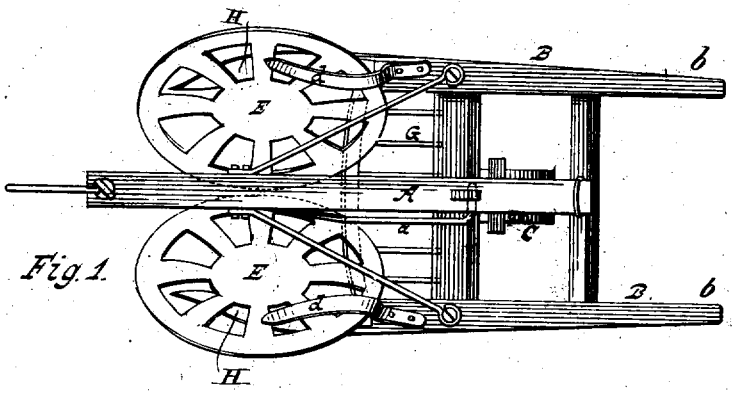
Figure 7:
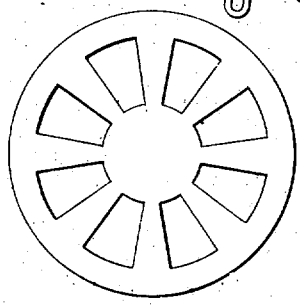
Figure 2:
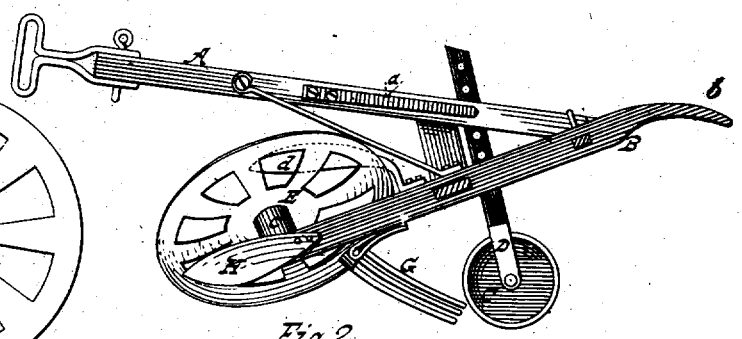
Figure 3:
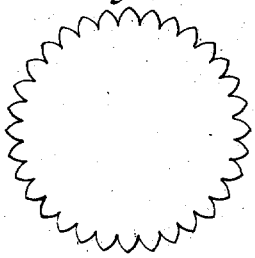
Figure 4:
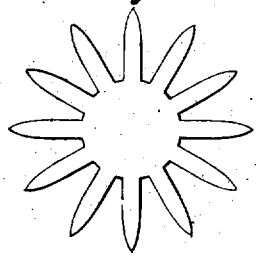
Figure 5:
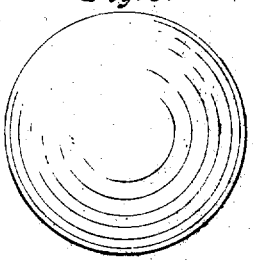

Figure 1 represents a plan or top view of a rotary cultivator embracing my improvements; Fig. 2, a side elevation thereof. Figs. 3, 4, and 5 represent various styles of cutters which may be used in place of perforated or spoked cutting-disks shown in Figs. 1 and 2. Figs. 6 and 7 are detail views of an open-disk cutting-wheel.

My invention more especially relates to that class of cultivators which are furnished with vertical rotating cutters or disks for turning, furrowing, and pulverizing the soil.

Letters Patent No. 85,451, granted to me December 29, 1868, show a rotary cultivator in which concavo-convex disks adjustable at an angle relatively to the line of draft are mounted upon gang-beams also adjustable relatively to the line of draft, and said patent shows a series of disks adjustable relatively to the line of draft upon a single transverse beam connected directly with the draft-bar.

My present invention is based on and constitutes an improvement upon the machine shown in my aforesaid Letters Patent. Heretofore, so far as my knowledge extends, it has been customary in machines of this class to change the angles of the disks relatively to the line of draft by means of a bolt or nut, which method of construction necessitates the employment of a wrench, and consumes considerable time in effecting such adjustment.

Such disks have also heretofore, with the exception of my patent hereinbefore recited, been set at an angle one at a time, which mode of adjustment renders it difficult to set several disks at a uniform pitch.

Concavo-convex cutting-disks have also heretofore been made without a continuous cutting edge or rim, and having openings, spaces, or perforations in the side thereof between the rim and the hub.

Prior to my invention such disks have been made with projections or bosses on their working-faces.

The objects of the first part of my invention are to enable the operator readily to adjust and control the cutting-disks while in operation; to which end my improvements consist—

First, in combining a main frame, a draft-bar, cutting-disks mounted on the main frame at an angle with the line of draft and supporting the frame above the ground, mechanism for adjusting the disks, and a detent for locking the adjusting mechanism and the disks in their adjusted position.

Second. My improvement further consists in combining a main frame, a draft-bar, cutting-disks arranged on opposite sides of the draft-bar at an angle with the line of draft, the disks supporting the frame, mechanism for varying the angle of the disks, a detent for locking the adjusting mechanism and the disks in their adjusted position, whereby the operator obtains a lever purchase sufficient to set the disks at one time at any desired angle, notwithstanding they may be embedded in the earth, which forms a resistance against their sides sufficient to require the strength of a man when no lever or purchase is afforded, and whereby a boy can adjust all the disks simultaneously without a wrench in such a manner that they will all retain the same pitch relatively to the line of draft.

Third. My improvement further consists in combining a main frame, a slotted draft-bar connected therewith, cutting-disks mounted on the frame, an adjustable bar passing endwise through the slot in the draft-bar, and a detent, whereby the angle of the disks may be varied relatively to the line of draft.

Fourth. My invention further consists in combining a draft-bar, a cross-bar, cutting-disks arranged on opposite sides of the draft-bar, which support the frame above the ground, a perforated bar for varying the angle of the disks, and a dog which enters the perforations in the bar for holding the disks at the angle to which they are set.

Fifth. The next part of my invention relates to the construction of the cutting-disk itself. Its object is to lessen the working strain upon the disk, and to assist the stirring of the soil, and to insure the breaking of clods or lumps, which ends I attain by constructing a concavo-convex disk with a continuous cutting edge or rim connected with its hub by means of spokes or radial arms left by perforating the disk.

Sixth. My invention further consists in a revolving cutter provided with a continuous cutting rim or edge connected with its axle or hub by means of spokes.

The accompanying drawings represent a machine having a draft bar or pole, A, attached to a downwardly-projecting main frame, B, the rear extension of said beams B of which constitute a lever-handle, *b*, by which the operator may obtain a lever purchase to vary the angle of the disks.

An adjusting-bar, D, in which a supporting-roller, C, is mounted, passes through slots in the frame and draft-bar, by means of which the adjusting-bar is firmly supported against lateral strains, and yet can be readily moved in relation to its supports in order to adjust the frame and draft-bar at various heights above the ground.

A spring-dog, *a*, upon the draft-bar enters into one of the series of holes in the adjusting-bar and locks it at the desired position in a well-known way. The adjusting-bar and spring-dog constitute a detent by which the frame may be held in any desired position.

Concavo convex rotating disks E are shown as provided with continuous rims or cutting-edges connected with their hubs by means of radial spokes formed by corresponding perforations in the disk, which openings prevent accumulations of wet earth upon the face of the disk and assist the working of the soil. These disks are shown as mounted on short stud-axles *c* on the lower end of the down-hanging main frame—the axles inclined, it will be observed, both to the line of draft and to the horizon. The drawings show two such disks symmetrically arranged on opposite sides of the tongue, with their convex or working faces upward, and so arranged as to cut up, turn over, and cover weeds or other such things. The working faces or convex faces of these disks, it will be observed, are made smooth, which construction prevents any tendency to clog the faces of the disks.

Scrapers *d*, mounted on the frame, project over the surface of the disks, to portion of which they conform, and thus serve to keep them free from clogging matter.

Owing to the organization above described, when the rear end of the frame is lowered or raised by the handles, the angles of the disks relatively to the line of draft and to the horizon are varied, as will be shown from an inspection of the drawings.

An apron, G, in the shape of a bent rake-head, is hinged to the lower portion of the main frame, its teeth projecting backward and downward and acting as rakes still further to stir up and pulverize the soil turned over by the disks.

A plow, *h*, projects downward and forward from the lower front end of each side beam of the main frame.

It will be observed the cutting-disks really support the implement, while the plows *h* serve to prevent the machine from tilting sidewise and support the disks laterally.

The operation of the machine will readily be understood from the foregoing description.

In another division of this application I have claimed the combination of a draft-bar, a main frame, disks secured upon the cross-beam, and guiding-handles in a machine without a support other than the disks themselves.

I do not, of course, mean to claim in this division anything which forms the subject-matter of the one above referred to.

Having thus described my improvements in rotary cultivators, what I claim as of my own invention is—

1. The combination, substantially as hereinbefore set forth, of a main frame, a draft-bar, cutting-disks mounted on the frame at an angle with the line of draft and supporting the frame above the ground, mechanism for adjusting the angle of the disks, and a detent for locking the adjusting mechanism and the disks in their adjusted position.

2. The combination, substantially as hereinbefore set forth, of a main frame, a draft-bar, cutting-disks arranged on opposite sides of the draft-bar at an angle with the line of draft and supporting the frame, mechanism for varying the angle of the disks, and a detent for locking said mechanism and the disks in their adjusted position.

3. The combination, substantially as hereinbefore set forth, of a main frame, a slotted draft-bar connected therewith, cutting-disks, an adjusting-bar passing endwise through the slot in the draft-bar, and a pawl or dog, whereby the angle of the disks may be varied and held relatively to the line of draft.

4. The combination, substantially as hereinbefore set forth, of a draft-bar, a cross-bar, cutting-disks arranged on opposite sides of the draft-bar and supporting the frame above the ground, a perforated bar for varying the angle of the disks, and a dog which enters the perforations in the bar for holding the disks at the angle to which they are set.

5. A revolving concavo-convex disk-cutter, constructed, substantially as hereinbefore set forth, with a continuous unobstructed rim or cutting-edge connected with its hub by spokes.

6. In a cultivator or other earth-turning implement, a revolving continuous unobstructed cutting rim or edge connected with its axle or hub by means of spokes.

In testimony that I claim the foregoing as my own I have hereunto set my hand and affixed my seal in the presence of two witnesses.

MOSES JOHNSON. [L. S.]

Witnesses:
C. M. SOUTHWORTH,
ALFRED H. ROWELL.